June 1, 1954  P. FLAMM  2,679,754
MEANS FOR MEASURING RECIPROCATING ENGINE PERFORMANCES
Filed Aug. 24, 1949
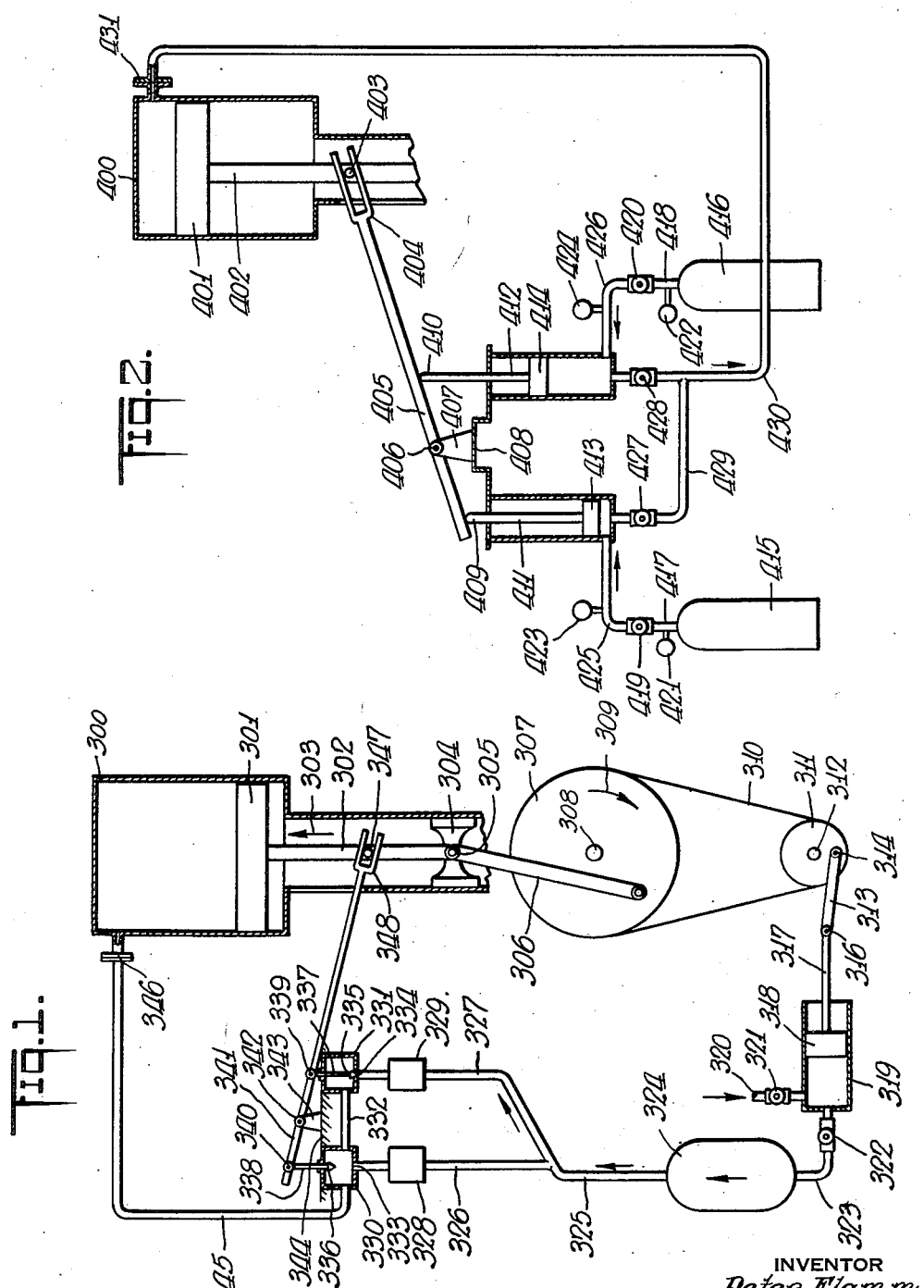
INVENTOR
Peter Flamm
BY
ATTORNEY Patented June 1, 1954

2,679,754

UNITED STATES PATENT OFFICE 2,679,754

MEANS FOR MEASURING RECIPROCATING ENGINE PERFORMANCES

Peter Flamm, Kiel, Germany, assignor to Arno Thun, New York, N. Y.

Application August 24, 1949, Serial No. 112,006

2 Claims. (Cl. 73—115)

The present invention relates to means for measuring engine performances and it particularly relates to means for measuring reciprocating engine performances.

In my co-pending application, Serial No. 112,005 filed August 24, 1949, I have disclosed methods and means of using compressed air or other fluid flasks to force air into the cylinder of an engine.

In connection with reciprocating engines, particularly of the piston type, the usual engine diagram is of value in laboratory testing but has not proved to be of practical importance in the commercial field where the engine is actually operating to carry a load either as a stationary engine or as a locomotive or vehicle engine.

It is not possible to secure rapidly and quickly, without involved calculations, the various figures which would be needed to determine reciprocating engine performance in commercial installations or locomotive or vehicle engines of various types.

It is among the objects of the present invention to provide a simple, practical and commercial procedure for determining reciprocating engine performance which will permit the operator of a stationary or moving reciprocating engine installation readily to determine the performance of such engine and particularly which will enable the operator to quickly determine the value of mean indicating piston or cylinder pressure.

The usual indicator is a delicate instrument and cannot be subjected to long usage as it would encounter in commercial practice for use upon stationary or reciprocating engines. The accuracy of such instruments is not only influenced by vibration but by its own mass.

It is therefore among the further objects of the invention to provide a novel indicating means for determining engine performance which will enable a rapid evaluation of power, fuel consumed, efficiency of personnel and which will give a ready indication of road, weather, friction and other difficulties and which can be used directly upon commercial operating engines, whether stationary or motive.

A further object is to provide an engine indicating means which will not be readily subject to inaccuracy due to vibration, lack of care and maintenance and which will directly give indication of the average mean pressure, from which it is possible to judge engine performance with an unknown load as well as the characteristics of the engine installation and the quantity of the consumed fuel.

A further object is to provide a novel reciprocating engine indicator which will be altogether devoid of wear of mechanical parts, such as pistons, springs, gears, flywheels and so forth, and which will function effectively either at high speeds, such as above 700 to 800 R. P. M.

In many types of engine performance installations it is necessary to employ a planimeter, particularly in laboratory installations, where it is desirable to determine the power output or mean average pressure of the installation and it is among the further objects of the present invention to provide an installation which will give direct results without the necessity of using a planimeter.

In accomplishing the above objects, it has been found most satisfactory to provide a performance indicating system and procedure which will depend upon maintaining a pressure in desired proportion or ratio to the pressure in the engine cylinder.

It is also among the further objects of the present invention to provide a novel engine performance indicating arrangement which will accurately, effectively and practically indicate the operating characteristics of a reciprocating engine without the need for removing gases from the cylinder and without liability of clogging external orifices or affecting the accuracy of diaphragms and pistons from the dust and dirt in the cylinder.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory to provide a source of gas pressure and preferably air pressure substantially higher than the maximum pressure in the engine cylinder. This source of pressure may include a pump actuated by the engine or a reciprocating metering device actuated by the engine.

The pressure will cause flow through suitable conduits and orifices into the cylinder of the engine. If desired, a plurality of controls may be employed, to cause the fluid to flow through one chamber when the engine is in a compression stroke and the other being arranged to receive the flow when the engine is in an expansion stroke.

The arrangement may consist of alternating valved connections operated by the reciprocating engine or by suitable metering piston-cylinder arrangements.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side diagrammatic layout showing the arrangement of the engine indicating procedure according to the present invention.

Fig. 2 is a side diagrammatic layout of an alternative arrangement.

Referring to Fig. 1, there is shown an engine cylinder 300 having a piston 301 and a connecting rod 302. The piston reciprocates as indicated at 303. The connecting rod 302 has a sliding guide 304 with a pivotal connection at 305 to the crank rod 306 which is driven by the crank 307.

The crank 307 is on shaft 308 and turns in the direction 309. The crank 307 drives, by a belt or chain 310, the wheel 311 on the shaft 312. The wheel 311 also acts as a crank and drives the crank rod 313 by the connection 314. The rod 313 is connected to the pivot 316 on the connecting rod 317. The connecting rod 317 operates a piston 318 in the cylinder 319.

The auxiliary cylinder 319 receives air from the inlet 320 past the check valve 321 and then forces air out through the check valve 322 of the conduit 323 to the pressure vessel 324.

From the vessel 324, the compressed air will flow, as indicated by the conduit 325 and the conduit 326 and 327, past the flow meters 328 and 329 to the chambers 330 and 331. The chambers 330 and 331 are connected by the passage or pipe 332.

These chambers are provided with the valve seats 333 and 334 which cooperate with the valves 335 and 336 on the stems 337 and 338. The valve stems 337 and 338 have pivotal connections 339 and 340 on the reciprocating actuating rod 341. The rod 341 is pivotally mounted at 342 on the standard 343 on the base 344.

The chamber 330 is connected by the conduit or pipe 345 to the orifice or restriction connection 346 into the interior of the cylinder 300.

The rod 341 is driven by the pin 347 on the connecting rod 302 sliding in the clevis 348.

The arrangement as shown in Fig. 1 is particularly advantageous inasmuch as the pressure created in the cylinder 319 is created by the engine 300—301 itself through the pump 318—319 and does not require outside pressure bottles or compressed air tanks.

The pressure in the chamber 324 should always be higher than the maximum pressure in the cylinder 300. The valves 335 and 336 and valve stems 337 and 338 are provided with suitable snap action arrangements so that the valve 336 will be closed during the upstroke or compression stroke and the valve 335 will be closed during the downstroke or expansion stroke.

Flow through meter 328 will therefore only take place during the expansion stroke while flow through meter 329 will only take place during the compression stroke.

The meters 328 and 329 may be replaced by pressure gauges which will give an automatic recorded reading for the entire run.

The meters 328 and 329 will give readings from which the engine performance may be determined.

The advantage of the present arrangement particularly resides in the fact that the flow of the mixture medium is not unduly influenced by the speed of the engine and the mean pressure may be readily obtained and totalled on a distance basis to give results which could only otherwise be obtained by obtaining diagrams and then working from such diagrams with a planimeter to determine the area thereof.

In the arrangement shown in Fig. 2, the engine cylinder 400 has a piston 401 with a connecting rod 402. The connecting rod 402 has a pin 403 which slides in the clevis 404.

The clevis 404 is at the end of a rod 405. The rod 405 is mounted at 406 on the bracket 407 on the stand 408. The rod 405 contacts the upper ends 409 and 410 of the piston rods 411 and 412 having the pistons 413 and 414.

The pistons 413 and 414 act as fluid or air meters and they withdraw air or some other neutral gas under pressure from the bottles or flasks 415 and 416 through the conduits 417 and 418 and the control and non-return check valves 419 and 420.

The gauges 421 and 422 will indicate the pressure in the containers 415 and 416 and also indicate the flow from the containers 415 and 416 while the gauges or flow meters 423 and 424 will indicate the flow or pressures in the conduits 425 and 426 and in the auxiliary metering pumps 413 and 414.

From the meters 413 and 414 the air or fluid will pass by the non-return check valves 427 and 428 and the conduits 429 and 430, past the restriction or orifice element 431 to the cylinder 400.

These pumps 413 and 414 withdraw the air or other fluid under pressure from the flasks 415 and 416.

The pressure in flasks 415 and 416 will always be higher than that in the cylinder 400. The flow from the cylinder 415 registering in gauge 421 will only take place during the downstroke. The flow from cylinder 416 registering on gauge 422 will only take place during the upstroke.

The flow and mean pressure may then be calculated from readings of gauges 421 and 422.

The devices shown in Figs. 1 and 2 will eliminate the difficulties encountered with mechanical engine indicators since there are no moving parts.

In calculating the engine performance from the readings above obtained the average mean pressure is determined for each run or over each interval to be measured from the pressure loss in the compressed air flasks upon a time basis or by the recording of the fluid flow into the engine cylinder.

The sum of the various mean pressures multiplied by the time elapsed for each of said mean pressures divided by the total time will give the overall average mean pressure.

It is altogether unnecessary to obtain an engine diagram by an engine indicator, then determine its area by a planimeter and determine the average pressure by division of said area.

The arrangement for feeding air or other fluid under pressure into the cylinder from only one pressure source during the expansion stroke and from another pressure source during the compression stroke is only shown diagrammatically above. Suitable snap action valving or electromagnet arrangements will be provided to closely synchronize these operations with the valves.

Or a valve may be used with one side open and the other side closed and alternating the open with closed side.

In all cases both valves are synchronized to the crankshaft of the engine that one valve is only open during the time of compression and the other valve is only open during the work period or expansion period of the cylinder.

As a result the measuring medium from one pressure source will flow into the engine cylinder only during the compression period, and the measuring medium from the other source will flow into the cylinder only during the expansion or work period.

Thus to obtain the average value all that is necessary after the measuring period is to deduct the quantities of the measuring medium which have measured from each other.

It is important that the opening and closing of the valves takes place exactly at the dead end moment of the piston at each end.

The system at all times must be accurately synchronized with the engine cycle. Where it is impractical to employ high pressure air flasks as a source for the measuring medium a fluid or air pressure pump may be used.

The pump may be directly coupled to the crankshaft of the engine or independently operated. Where the pump is driven by the engine the pressure of the measuring medium will rise with the increase in the R. P. M. or fall with the decrease of the R. P. M. of the engine. Nevertheless the consumed amount of the measuring medium will remain constant if the pressure in the engine cylinder remains unchanged since the time cycle is shortened or lengthened with the increase or decrease of the R. P. M. of the engine and thus is proportionately regulated.

Whatever is lost on flow time is equalled through the increased pressure as long as the mean pressure in the engine cylinder remains unchanged.

As soon as variations of the mean pressure occur, the amount of the measuring medium or compressed air is changed proportionately to the pump pressure and also relative to the mean pressure in the engine cylinder.

The amount of the measuring medium or compressed air used may at all times be determined through flow, volume or pressure meters giving momentary or continuous recordings. The meters may also give all the values automatically instead of only indicating the momentary value at any given moment.

This measurement of the measuring medium or compressed air will not be influenced through the speed of the engine. Through this arrangement the mean pressure is obtained and added up on a distance basis, which is identical with the result obtained from the planimetered indicator. The working elements of the mechanical indicator will thus have been eliminated.

As many changes could be made in the above methods and means for measuring reciprocating engine performances and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A reciprocating engine performance measuring system comprising a source of fluid under pressure, means operated by said engine for compressing and supplying said fluid to said source at a pressure higher than that of said reciprocating engine cylinder, means connected to said source for feeding said fluid under pressure to said cylinder permitting said fluid to flow into said cylinder, flow measuring means connected to said last mentioned means for providing a measurement indicative of pressure variations within said engine cylinder.

2. The system of claim 1, said means operated by said engine including an auxiliary piston cylinder structure having an outlet conduit connection to said source and having a mechanical operating connection from said engine.

References Cited in the file of this patent

UNITED STATES PATENTS

| Number | Name | Date |
|---|---|---|
| 1,690,158 | Lehmann | May 22, 1934 |
| 2,212,466 | Bradford | Aug. 20, 1940 |